US006353414B1

(12) United States Patent
Jones et al.

(10) Patent No.: US 6,353,414 B1
(45) Date of Patent: Mar. 5, 2002

(54) ANTENNA FOR A PORTABLE INFORMATION DEVICE

(75) Inventors: Jeffrey L. Jones, Orem; Sy Prestwich, West Jordan; John M. Wheeler, Salt Lake City; David J. Moore, Riverton; Steven Lo Forte, Midvale; Brent D. Madsen, Providence; Kurt J. Stewart, Lehi, all of UT (US)

(73) Assignee: 3Com Corporation, Rolling Meadows, IL (US)

( * ) Notice: Subject to any disclaimer, the term of this patent is extended or adjusted under 35 U.S.C. 154(b) by 0 days.

(21) Appl. No.: 09/605,320

(22) Filed: Jun. 27, 2000

(51) Int. Cl.⁷ .................................................. H01Q 1/24
(52) U.S. Cl. ......................................... 343/702; 455/90
(58) Field of Search .............................. 343/702, 872, 343/900, 906; 364/708.1; 455/90; H01Q 1/24

(56) References Cited

U.S. PATENT DOCUMENTS

| | | | | |
|---|---|---|---|---|
| 5,539,417 A | * | 7/1996 | Terry et al. ................. | 343/702 |
| 5,657,258 A | * | 8/1997 | Grewe et al. ............. | 364/708.1 |
| 6,064,342 A | * | 5/2000 | Sandhu et al. .............. | 343/702 |
| 6,127,979 A | * | 10/2000 | Zhou et al. .................. | 343/702 |
| 6,166,697 A | * | 12/2000 | Granqvist et al. .......... | 343/702 |
| 6,215,454 B1 | * | 4/2001 | Tran ............................ | 343/841 |

* cited by examiner

*Primary Examiner*—Tho Phan
(74) *Attorney, Agent, or Firm*—Baniak Pine & Gannon

(57) ABSTRACT

An apparatus and method of mounting an antenna in a portable information device (PID) are provided. The PID includes a housing having an elongated slot formed therein. A circuit board is disposed with the housing. An elongated antenna housing including a first end and a second end is received in the elongated slot. A conductive contact member is positioned within the elongated antenna housing, and an antenna member is positioned within the elongated antenna housing. The antenna member is electrically connected with the conductive contact member. A conductive connection clip is attached to the housing for providing an electrical connection between the conductive contact member and the circuit board. The conductive connection clip includes a first end portion and a second end portion. The second end portion of the conductive connection clip is operatively connected to the circuit board and the first end portion of the conductive connection clip contacts the conductive contact member positioned within the elongated antenna housing to allow signals to be transmitted from the antenna member to the circuit board and vice versa.

33 Claims, 4 Drawing Sheets

ANTENNA FOR A PORTABLE INFORMATION DEVICE

FIELD OF THE INVENTION

This invention relates generally to the field of portable information devices (PID) and in particular, to an apparatus and method of mounting an antenna in a stylus port of a PID.

BACKGROUND OF THE INVENTION

Conventional PIDs such as, for example, the Palm™ series of Personal Digital Assistants (PDA) offered by Palm Inc., of Santa Clara, Calif., typically include a manually operable stylus. The stylus is a writing utensil that enables the operator to control and input data into the device via the touch sensitive display screen. The housing of these devices may include two elongated slots, the first slot formed along one side wall of the housing, and the second slot formed along the other side wall of the housing. Each slot is configured to receive and house the stylus when the device is not in use.

In certain applications, these PIDs are adapted to be used for wireless communications. In particular, these devices typically include some type of radio circuit board and associated antenna, which enables the devices to send and receive radio signals in a wireless environment. Attempts have been made to provide an antenna for wireless applications. Typically, they are "clip-on" modules that must be fastened to the handheld communications device in some fashion. The disadvantage of these conventional "clip-on" modules is that they are usually not integrally formed within the existing dimensions of the device. Instead, the modules are typically large and bulky, and occupy a considerable amount of space. As a result, these conventional "clip-on" modules detract from the portable nature of the device. For example, PIDs having these modules typically cannot be stowed in one's pocket when traveling from one location to another.

Accordingly, it would be desirable to have an apparatus and method for mounting an antenna in a PID that overcomes the disadvantages described above.

SUMMARY OF THE INVENTION

One aspect of the invention provides a PID including a housing having an elongated slot formed therein. A circuit board is disposed with the housing. An elongated antenna housing including a first end and a second end is received in the elongated slot. A conductive contact member is positioned within the elongated antenna housing, and an antenna member is positioned within the elongated antenna housing. The antenna member is electrically connected with the conductive contact member. A conductive connection clip is attached to the housing for providing an electrical connection between the conductive contact member and the circuit board. The conductive connection clip includes a first end portion and a second end portion. The second end portion is operatively connected to the circuit board, and the first end portion contacts the conductive contact member to allow signals to be transferred from the antenna member to the circuit board and vice versa. The first end portion of the conductive connection clip may preferably be positioned in the elongated slot. The housing may preferably include a first end and a second end, and the conductive connection clip may preferably be positioned adjacent to the first end of the housing. The conductive connection clip may preferably be comprised of a conductive alloy. The elongated slot may preferably be configured to receive a stylus. The housing may also include a first side and a second side, and the elongated slot may preferably be positioned along the first side of the housing. A second elongated slot may preferably be positioned along the second side of the housing. The second elongated slot positioned along the second side of the housing may preferably be identical to the elongated slot positioned along the first side of the housing. The second elongated slot is configured to receive a stylus. The conductive contact member may preferably be positioned within the antenna housing adjacent to the first end of the antenna housing. The elongated antenna housing may preferably include an opening formed therein, and the conductive connection clip may preferably extend through the opening to contact the conductive contact member. The opening may preferably receive the first end portion of the conductive connection clip. The antenna member may preferably be configured to be positioned in an extended position and a retracted position. The antenna member may preferably include a first end and a second end. The first end of the antenna member may preferably include a manually operable cap portion to allow the antenna member to be positioned between the retracted position and the extended position. The second end of the antenna member may preferably include an antenna collection collet. The antenna collection collet may preferably be electrically connected with the conductive contact member and the conductive connection clip. A cover for the PID may also be provided. The cover may preferably be operatively connected to the elongated antenna housing. A flexible hinge member may also be provided. The flexible hinge member may preferably be attached the cover and to the elongated antenna housing. An attachment stub may preferably be attached to the elongated antenna housing and to the flexible hinge member.

Another aspect of the invention provides a method of mounting an antenna in a PID. A housing for the PID is provided. The housing includes an elongated slot formed therein, and a circuit board is disposed with the housing. An elongated antenna housing includes a first end and a second end. A conductive contact member is positioned within the elongated antenna housing, and an antenna member is positioned within the elongated antenna housing. The antenna member is electrically connected with the conductive contact member. A conductive connection clip is attached to the housing. The conductive connection clip includes a first end portion and a second end portion. The second end portion is operatively connected to the circuit board. The elongated antenna housing is inserted into the elongated slot, and the second end portion of the conductive connection clip contacts against the conductive contact member. Signals are transferred from the antenna member to the circuit board and vice versa. The elongated antenna housing may also include an opening formed, and the conductive connection clip may preferably extend through the opening to contact the conductive contact member.

Another aspect of the invention provides a PID including a housing having an elongated slot formed therein. A circuit board is disposed with the housing. An elongated antenna housing including a first end and a second end is received in the elongated slot. A first conductive contact member is positioned within the elongated antenna housing adjacent to the first end of the elongated antenna housing. A second conductive contact member is positioned within the elongated antenna housing adjacent to the second end of the elongated antenna housing. An antenna member is positioned within the elongated antenna housing. The antenna member is configured to be positioned in a retracted position and an extended position. The antenna member is electrically connected with the first conductive contact member when the antenna member is in the extended position. The antenna member is electrically connected with the second conductive contact member when the antenna member is in the retracted position. A first conductive connection clip is attached to the housing for providing an electrical connection between the first conductive contact member and the circuit board. The first conductive connection clip includes a first end portion and a second end portion. The second end portion of the first conductive connection clip is operatively connected to the circuit board, and the first end portion of the first conductive connection clip contacts the first conductive contact member to allow signals to be transferred from the antenna member to the circuit board and vice versa when the antenna member is in the extended position. A second conductive connection clip is attached to the housing for providing an electrical connection between the second conductive contact member and the circuit board. The second conductive connection clip includes a first end portion and a second end portion. The first end portion of the second conductive connection clip is operatively connected to the circuit board, and the second end portion of the second conductive connection clip contacts the second conductive contact member to allow signals to be transmitted from the antenna member to the circuit board and vice versa when the antenna member is in the retracted position. The first end portion of the first conductive connection clip may preferably be positioned in the elongated slot, and the second end portion of the second conductive connection clip may preferably be positioned in the elongated slot. The antenna member may preferably include a first end and a second end. The first end of the antenna member may preferably include a manually operable cap portion to allow the antenna member to be positioned between the retracted position and the extended position. The second end of the antenna member may preferably include an antenna collection collet. The antenna collection collet may preferably be electrically connected with the first conductive contact member when the antenna member is in the extended position. The antenna collection collet may preferably be electrically connected with the second conductive contact member when the antenna member is in the retracted position.

Another aspect of the invention provides a method of mounting an antenna in a PID. A housing for the PID is provided. The housing includes an elongated slot formed therein. A circuit board is disposed with the housing. An elongated antenna housing including a first end and a second end is received in the elongated slot. A first conductive contact member is positioned within the elongated antenna housing adjacent to the first end of the elongated antenna housing. A second conductive contact member is positioned within the elongated antenna housing adjacent to the second end of the elongated antenna housing. An antenna member is positioned within the elongated antenna housing. The antenna member is configured to be positioned in a retracted position and an extended position. The antenna member is electrically connected with the first conductive contact member when the antenna member is in the extended position. The antenna member is electrically connected with the second conductive contact member when the antenna member is in the retracted position. A first conductive connection clip is attached to the housing. The first conductive connection clip includes a first end portion and a second end portion. The second end portion of the first conductive connection clip is operatively connected to the circuit board. A second conductive connection clip is attached to the housing. The second conductive connection clip includes a first end portion and a second end portion. The first end portion of the second conductive connection clip is operatively connected to the circuit board. The elongated antenna housing is inserted into the elongated slot. The first end portion of the first conductive connection clip is contacted against the first conductive contact member. The second end portion of the second conductive connection clip is contacted against the second conductive contact member. Signals are transferred from the antenna member to the circuit board and vice versa when the antenna member is in the extended position. Signals are transferred from the antenna member to the circuit board and vice versa when the antenna member is in the retracted position. The antenna member may preferably include a first end and a second end. The first end of the antenna member may preferably include a manually operable cap portion, and the second end of the antenna member may preferably include an antenna collection collet. The antenna member may preferably be positioned in the extended position to allow the antenna collection collet to be electrically connected with the first conductive contact member. The antenna member may preferably be positioned in the retracted position to allow the antenna collection collet to be electrically connected with the second conductive contact member.

The invention provides the foregoing and other features, and the advantages of the invention will become further apparent from the following detailed description of the presently preferred embodiments, read in conjunction with the accompanying drawings. The detailed description and drawings merely illustrative of the invention and do not limit the scope of the invention, which is defined by the appended claims and equivalents thereof

DETAILED DESCRIPTION OF THE PRESENTLY PREFERRED EMBODIMENTS

Figures 1A, 1B:
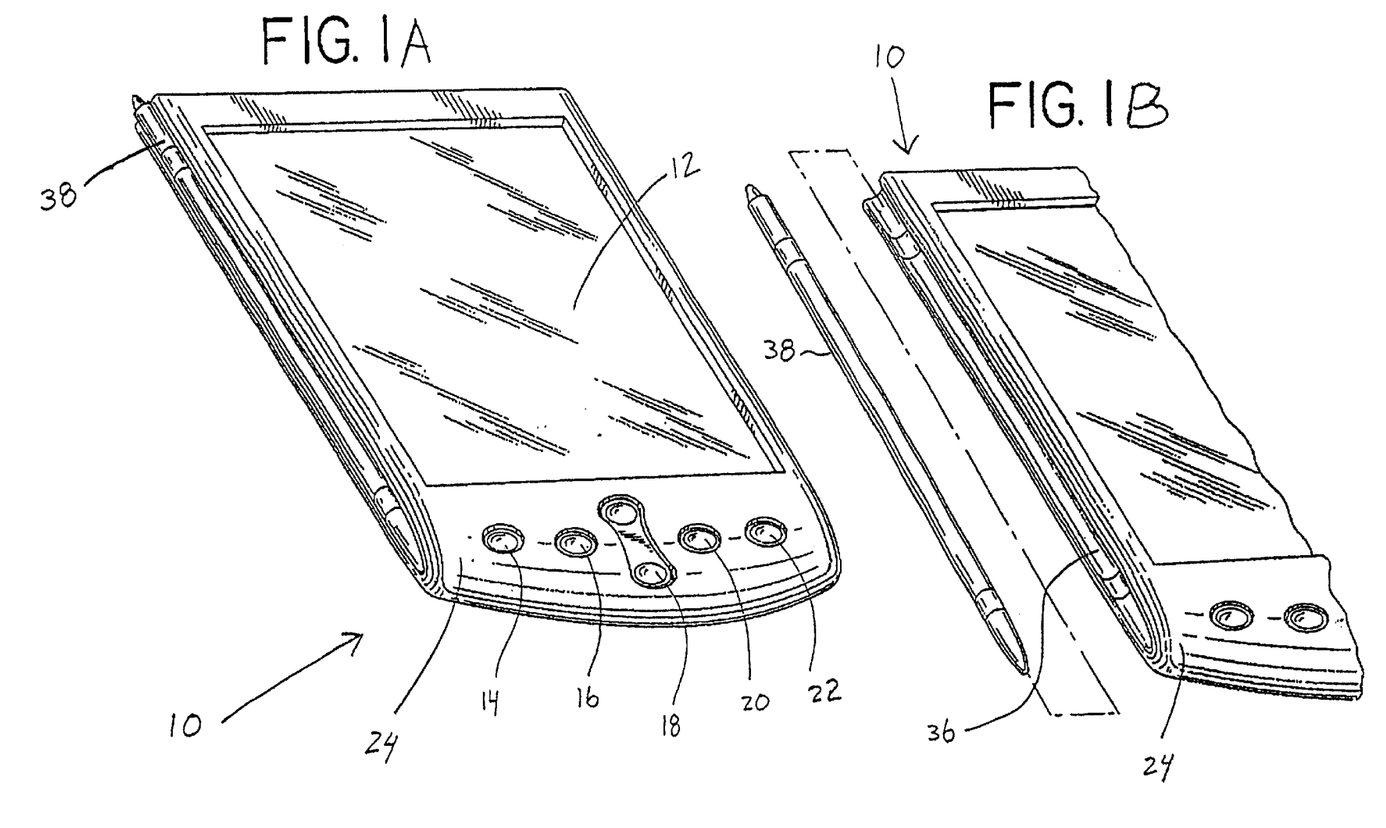
FIG. 1A is a perspective view of a preferred embodiment of a personal information device (PID) that is made in accordance with the invention showing an antenna housing inserted into an elongated slot formed in the housing of the PID.
FIG. 1B is a partial view of the embodiment of FIG. 1 showing the antenna housing exploded from the elongated slot.
Figures 2, 3:
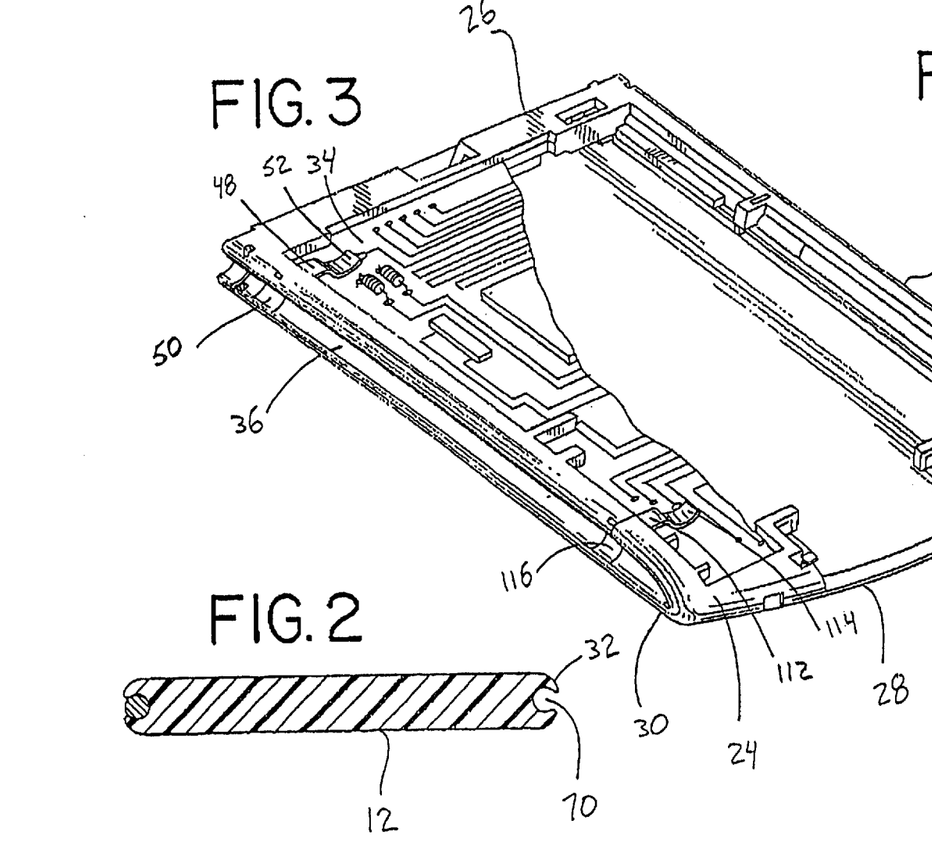
FIG. 2 is a sectional view of the embodiment of FIG. 1.
FIG. 3 is a perspective view of a housing of the PID of FIG. 1 showing a portion of a circuit board mounted within the housing.

A preferred embodiment of a personal information device (PID) 10 is shown in FIG. 1. The PID 10 may preferably be any one of the commercially available handheld communications devices such as, for example, the Palm™ series of PDAs offered by Palm, Inc. of Santa Clara, Calif. The PID 10 may preferably include a touch activated display screen 12 and a plurality of manually operable buttons 14, 16, 18, 20, 22 to allow a user to control and enter data into the device 10. As shown in FIGS. 1A, 1B, and 3, the PID 10 may preferably include an outer housing 24. In the embodiment shown in FIG. 3, for example, the housing 24 may preferably be a rectangular shaped member including a first end 26, a second end 28, a first side 30, and a second side 32. The housing 24 may preferably be formed from any type of rigid, insulative material.

Referring again to FIG. 3, a circuit board 34 may preferably be disposed within the housing 24. The circuit board 34 may preferably be used to interconnect various electronic components positioned within the PID 10. The circuit board 34 may preferably be any conventional printed circuit board, and may preferably be any conventional printed circuit board for processing radio signals.

Referring to FIGS. 1A and 3, the housing 24 includes an elongated slot 36 formed therein. The elongated slot 36 may preferably be positioned along the first side 30 of the housing 24. The elongated slot 36 may preferably extend from the first end 26 of the housing 24 to the second end 28 of the housing 24. As shown in FIGS. 1A and 1B, the elongated slot 36 is configured to receive an elongated antenna housing 38. In the embodiment shown, the elongated antenna housing 38 is configured to be slidably received in the elongated slot 36.

Figures 4, 5, 6:
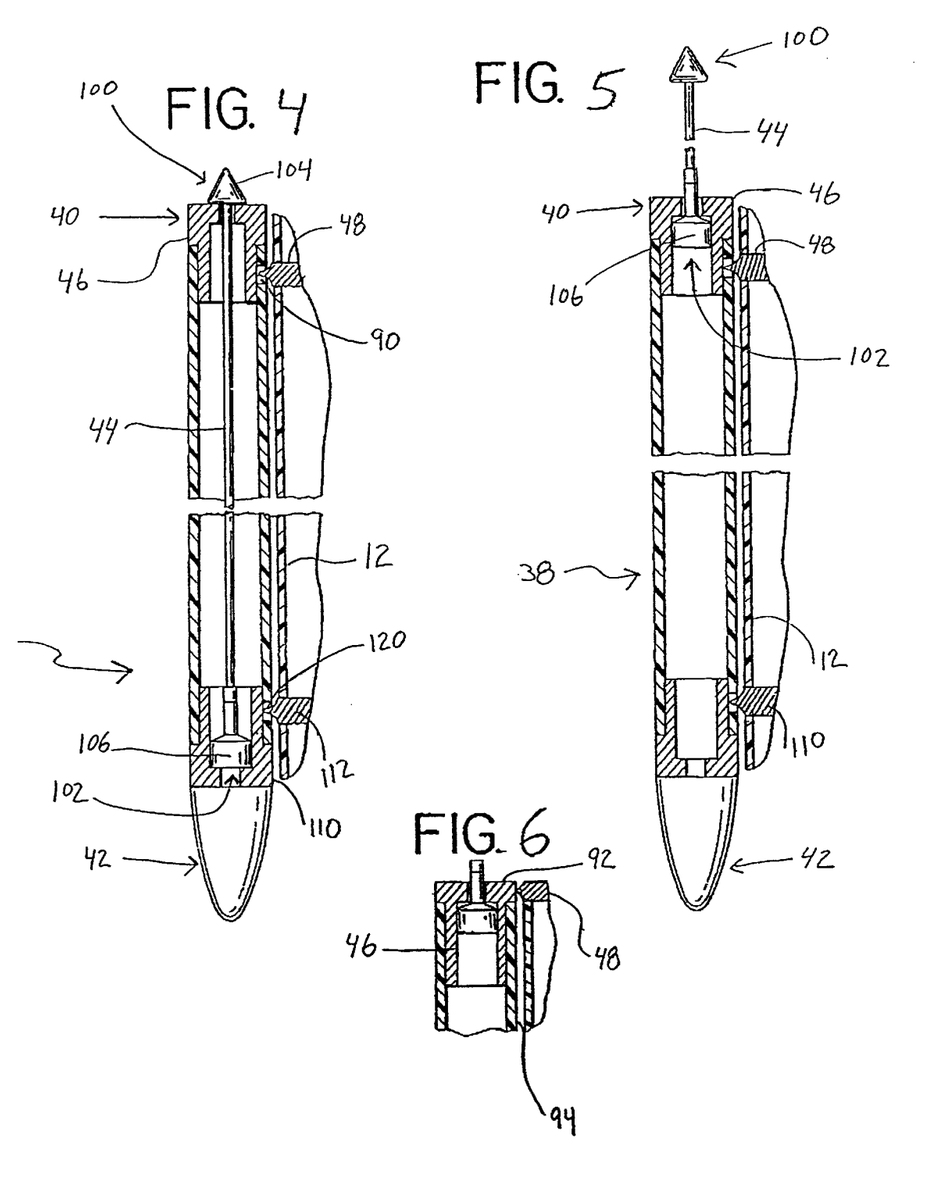
FIG. 4 is a sectional view of the antenna housing of FIGS. 1A and 1B and a portion of the housing showing the antenna member in the retracted position.
FIG. 5 is the embodiment of FIG. 4 showing the antenna member in the extended position.
FIG. 6 is a sectional view of a portion of an antenna housing showing a conductive connection clip contacting a flange portion of a conductive contact member.

Referring to FIGS. 4 and 5, the elongated antenna housing 38 includes a first end 40 and a second end 42. The elongated antenna housing 38 may preferably be any housing suitable for housing an antenna member 44, and various shapes and configurations for the antenna housing 38 are contemplated. The elongated antenna housing 38 may preferably be constructed from any suitable rigid, insulative material. It should be understood by those of ordinary skill in the art that the antenna housing 38 may also be used as a stylus when it is not inserted into the elongated slot 36 of the housing 24 and is not being used as an antenna to send and receive radio signals. That is, a user may use the antenna housing 38 as stylus to input data into the device 10 via the touch activated display screen 12 (see FIG. 1A).

Referring again to FIGS. 4–5, a conductive contact member 46 is positioned within the elongated antenna housing 38. As discussed more fully below, the conductive contact member 46 provides a conductive link between the antenna member 44 and a conductive connection clip 48 that is attached to the housing 12. In the embodiment shown, the conductive contact member 46 is positioned within the antenna housing 38 adjacent to the first end 40 of the antenna housing 38. However, those of ordinary skill in the art will appreciate that the conductive contact member 46 may preferably be positioned at other locations within the antenna housing 38. The conductive contact member 46 may preferably be any conductive metal structure. In the embodiment shown, for the example, the conductive contact member 46 is a cylindrical metal sleeve, although other shapes and configurations are contemplated depending upon the particular application. The conductive contact member 46 may preferably be attached to the antenna housing 38 in any conventional manner. For example, the conductive contact member 46 may preferably be threaded to allow it to be screwed to the antenna housing 38. Alternatively, the conductive contact member 46 may preferably be insert molded as part of the antenna housing 38, or may simply be press fitted into place within the antenna housing 38.

As shown in FIGS. 4 and 5, the antenna member 44 is positioned within the elongated antenna housing 38. The antenna member 44 may preferably be any metallic device such as, for example, a rod or wire for radiating or receiving radio waves. The antenna member 44 may preferably be positioned in an extended position as shown in FIG. 5 and a retracted position as shown in FIG. 4. As shown in FIG. 5, when the antenna member 44 is in the extended position, the antenna member 44 is electrically connected with the conductive contact member 46. The antenna member 44 may preferably be a conventional monopole or dipole antenna to provide optimum omni-directional performance. In addition to the incorporation of a monopole or dipole antenna, a broadside helical radiator, such as those used in conventional cell phones, may also be implemented. In this scenario, the helix would preferably be the primary radiator and would ensure some form of connectivity when the monopole or dipole is in the retracted position (i.e. disconnected from the radio). By extending the monopole or dipole, the performance may preferably be enhanced, and the monopole or dipole may be the primary radiator instead of the helix.

Referring again to FIG. 3, the conductive connection clip 48 is attached to the housing 24. The conductive connection clip 48 may preferably be attached to the housing 24 in any conventional manner. In the embodiment shown, for example, the conductive connection clip 48 is positioned adjacent to the first end 26 of the housing 24, although it should be appreciated by those of ordinary skill in the art that the location of the conductive connection clip 48 may vary depending upon the particular application. As shown in FIGS. 3, 4 and 5, when the antenna housing 38 is inserted into the elongated slot 36, the conductive connection clip 48 provides an electrical connection between the conductive contact member 46 disposed with the antenna housing 38 and the circuit board 34 mounted within the housing 24. The conductive connection clip 48 may preferably be comprised of any conductive material (such as any conductive alloy), and various shapes and configurations are contemplated. In the embodiment shown in FIG. 3, for example, the conductive connection clip 48 includes a first end portion 50 and a second end portion 52. The second end portion 52 is operatively connected to the circuit board 34. The first end portion 50 of the conductive connection clip 48 may preferably be positioned in the elongated slot 36. When the elongated antenna housing 38 is inserted into the elongated slot 36, the first end portion 50 of the conductive connection clip 48 contacts the conductive contact member 46 to allow signals (such as, for example, radio frequency (RF) signals) to be transferred from the antenna member 44 to the circuit board 34 and vice versa.

Figure 9:
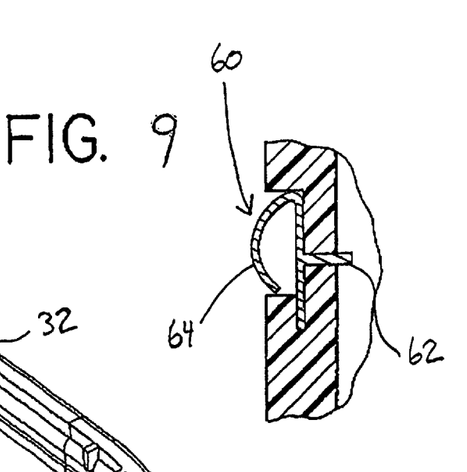
FIG. 9 is a side view of an alternative embodiment of a conductive connection clip.

FIG. 9 illustrates an alternative embodiment of a conductive connection clip 60. As shown in FIG. 9, the conductive connection clip 60 includes a stem portion 62, and a curved contact portion 64. The stem portion 62 may preferably be soldered to the circuit board 34. The curved contact portion 64 may preferably extend through an opening (not shown) in the housing 24 and extend into the elongated slot 36. The advantage of this arrangement is that the curved contact portion 64 reduces the likelihood that the antenna housing 38 will be snagged or hung up by the conductive connection clip 60 when the antenna housing 38 is inserted or removed from the elongated slot 36.

Figure 7:
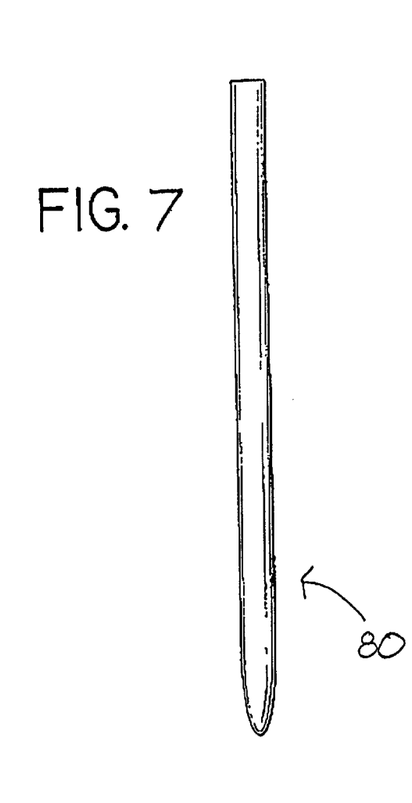
FIG. 7 is a plan view of a stylus.

Referring to FIG. 2, a second elongated slot 70 may preferably be positioned along the second side 32 of the housing 24. The second elongated slot 70 may preferably extend from the first end 26 of the housing 24 to the second end 28 of the housing 24. The second elongated slot 70 positioned along the second side 32 of the housing 24 may preferably be identical to the elongated slot 36 positioned along the first side 30 of the housing 24. The elongated slot 36 positioned along the first side 30 of the housing 24 and the second elongated slot 70 positioned along the second side 3 2 of the housing 24 may each preferably be a stylus port. That is, each slot 36, 70 may preferably be configured to receive a stylus 80, which is shown in FIG. 7. The stylus 80 may preferably be positioned in the elongated slot 36 when the elongated antenna housing 38 is not being used and is not received in the elongated slot 36. Similarly, the stylus 80 may preferably be positioned in the second elongated slot 70 when the elongated antenna housing 38 is not being used and is not received in the second elongated slot 70. The stylus 80 may preferably be any structure that can be manually manipulated by a user to allow the user to input information into the PID 10 by contacting the stylus 80 against the display screen 12 of the PID 10. It should be understood by those of ordinary skill in the art that a user may switch the elongated antenna housing 38 for the stylus 80 and vice versa, depending upon the preference of the user.

Referring again to FIGS. 4 and 5, the elongated antenna housing 38 may preferably include an opening 90 formed therein. When the antenna housing 38 is inserted in the elongated slot 36, the conductive connection clip 48 may preferably extend through the opening 90 to contact the conductive contact member 46. In the embodiment shown, for example, the opening 90 receives the first end portion 50 (see FIG. 3) of the conductive connection clip 48. Alternatively, it should be understood that the conductive connection clip 48 may preferably be configured to contact the conductive contact member 46 directly without the need for the conductive connection clip 48 to pass through an opening in the antenna housing 38. FIG. 6 illustrates one embodiment showing the conductive connection clip 48 contacting the conductive contact member 46 directly without extending through an opening in the antenna housing 38. In the embodiment shown in FIG. 6, for example, conductive contact member 46 includes a flange portion 92 that is flush with an outer surface 94 of the antenna housing 38, and the conductive connection clip 48 contacts a flange portion 92 directly.

As shown in FIGS. 4 and 5, the antenna member 44 is configured to be positioned in an extended position (shown in FIG. 5) and a retracted position (as shown in FIG. 4). The antenna member 44 includes a first end 100 and a second end 102. The first end 100 of the antenna member 44 may preferably include a manually operable cap portion 104. The manually operable cap portion 104 extends beyond the first end 40 of the antenna housing 38. This allows a user to grasp the manually operable cap portion 104 and quickly and easily manipulate the antenna member 44 between the retracted position and the extended position. Alternatively, a conventional spring-loaded mechanism (not shown) may preferably be employed, which would automatically extend the antenna member 44 from the retracted position to the extended position.

Referring again to FIGS. 4 and 5, the second end 102 of the antenna member 44 may preferably include an antenna collection collet 106. The antenna collection collet 106 may preferably be any conductive band, collar, ferrule or flange. The shape and configuration of the antenna collection collet 106 may vary depending upon the particular application. The antenna collection collet 106 may preferably be comprised of any suitable conductive material such as, for example, any conductive alloy. When the antenna member 44 is in the extended position (see FIG. 5), the antenna collection collet 106 is electrically connected with the conductive contact member 46, which in turn is electrically connected with the conductive connection clip 48. As a result, when the antenna member 44 is in the extended position, signals are transferred from the antenna member 44, to the conductive contact member 46, to the conductive connection clip 48, and then to the circuit board 34 (see FIG. 3). Similarly, signals may be transferred from the circuit board 34, to the conductive connection clip 48, to the conductive contact member 46, and to the antenna member 44. One advantage of the arrangement described above is that the antenna housing 38 can be easily inserted into and removed from the elongated slot 36. As a result, the antenna housing 38 (including the antenna member 44 disposed therein) can be implemented within the existing geometry of the PID 10, and can be quickly and easily transferred from one elongated slot (or stylus port) to another elongated slot (or stylus port). Moreover, placing the antenna member 44 in the antenna housing 38, which in turn is configured to be inserted into the elongated slot 36 (or stylus port), enables the PID 10 to be used in a wireless environment without the need for any "clip-on" antenna modules. As a result, the overall dimensions of the device 10 are not altered by the addition of the antenna member 44 and the associated antenna housing 38.

In the embodiment shown in FIGS. 4, and 5, a second conductive contact member 110 may also be provided. The second conductive contact member 110 may preferably be positioned within the elongated antenna housing 38 adjacent to the second end 42 of the elongated antenna housing 38. However, those of ordinary skill in the art will appreciate that the second conductive contact member 110 may preferably be positioned at other locations within the antenna housing 38 depending upon the particular application. As discussed more fully below, the second conductive contact member 110 provides a conductive link between the antenna member 44 and a second conductive connection clip 112 that is attached to the housing 24 of the PID 10. The second conductive contact member 110 may preferably be any conductive metal structure. In the embodiment shown, for the example, the second conductive contact member 110 is a cylindrical metal sleeve, although other shapes and configurations are contemplated depending upon the particular application. The second conductive contact member 110 may preferably be attached to the antenna housing 38 in any conventional manner.

As shown in FIG. 3, the second conductive connection clip 112 may preferably be attached to the housing 24 of the PID 10. The second conductive connection clip 112 may preferably be attached to the housing 24 in any conventional manner. In the embodiment shown, for example, the second conductive connection clip 112 is positioned adjacent to the second end 28 of the housing 24, although the location of the second conductive connection clip 112 may vary depending upon the particular application. When the antenna housing 38 is inserted into the elongated slot 36, the second conductive connection clip 112 provides an electrical connection between the second conductive contact member 110 disposed within the antenna housing 38 and the circuit board 34 (see FIG. 3) mounted within the housing 12. The second conductive connection clip 112 may preferably be comprised of any metal structure, and various shapes and configurations are contemplated. As shown in FIG. 3, the second conductive connection clip 112 may preferably include a first end portion 114 and a second end portion 116. The first end portion 114 of the second conductive connection clip 112 may preferably be connected to the circuit board 34. The second end portion 116 of the second conductive connection clip 112 may preferably be positioned in the elongated slot 36. As shown in FIGS. 4 and 5, when the elongated antenna housing 38 is inserted into the elongated slot 36, the second end portion 116 (see FIG. 3) of the second conductive connection clip 112 contacts the second conductive contact member 110. As a result, when the antenna member 44 is in the retracted position (see FIG. 4), signals are transferred from the antenna member 44, to the second conductive contact member 110, to the second conductive connection clip 112, and then to the circuit board 34. Similarly, signals may be transferred from the circuit board 34, to the second conductive connection clip 112, to the second conductive contact member 110, and to the antenna member 44. When the antenna member 44 is in the retracted position, the antenna member 44 is electrically connected with the second conductive contact member 110. The advantage of this arrangement is that signals can be transferred from the antenna member 44 to the circuit board 34 and vice versa even when the antenna member 44 is in the retracted position.

Referring again to FIG. 4, the elongated antenna 38 housing may preferably include a second opening 120 formed therein. When the antenna housing 38 is inserted in the elongated slot 36, the second conductive connection clip 112 may preferably extend through the second opening 120 to contact the second conductive contact member 110. In the embodiment shown, for example, the opening 120 receives the second end portion 116 of the second conductive connection clip 112. Alternatively, it should be understood that the second conductive connection clip 112 may preferably be configured to contact the second conductive contact member 110 directly without the need for the conductive connection clip 112 to pass through an opening in the antenna housing 38 as shown generally in FIG. 6.

Figure 8:
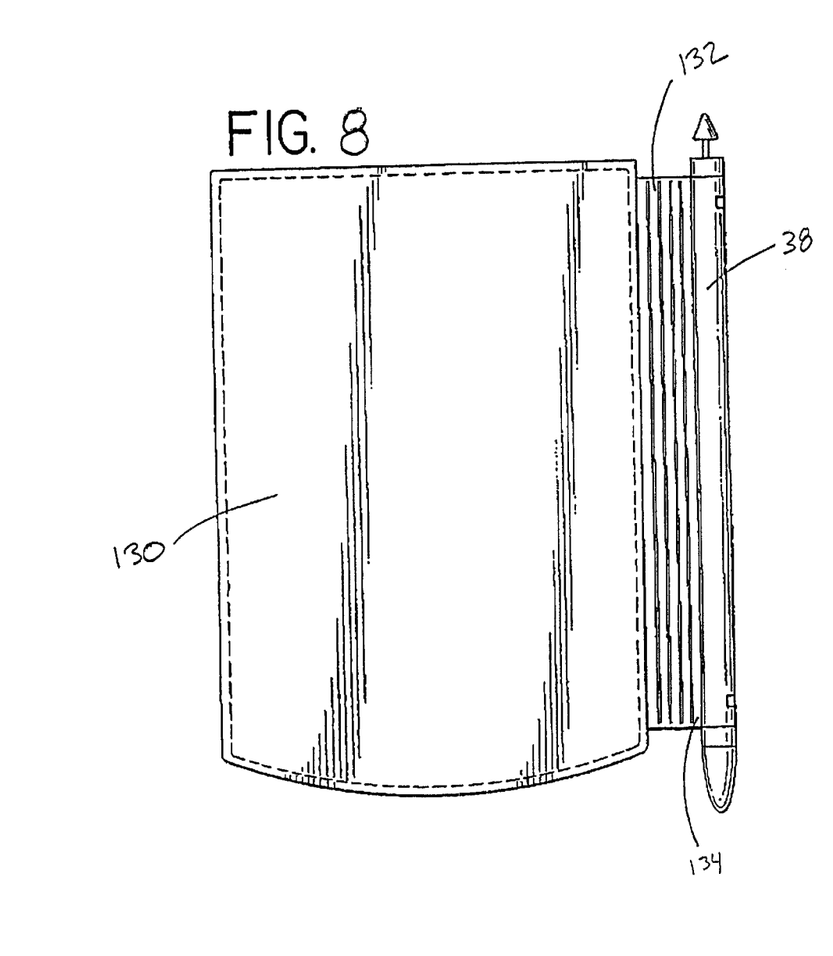
FIG. 8 is a plan view of the antenna housing of FIGS. 1A and 1B attached to a cover for the PID.

Referring to FIG. 8 the antenna housing 38 may preferably be attached to cover 130 for the PID 10. The cover 130 may preferably be any cover suitable or protecting the PID 10. In the embodiment shown, for example, the antenna housing 38 is attached to the cover 130 with a flexible hinge member 132, the flexible hinge member 132 positioned between the cover 130 and the antenna housing 38. The flexible hinge member 132 allows the cover 130 to rotate from an open position to a closed position and vice versa. An attachment stub 134 may also be provided, the attachment stub 134 positioned between the antenna housing 38 and the flexible hinge member 132. The attachment stub 134 allows the antenna housing 38 to be fastened to the flexible hinge member 132. One advantage of this arrangement is that the antenna housing 38 and associated antenna member 44 can be provided without impacting the operation and/or functionality of the cover 130.

In operation, and referring to FIGS. 1A, 1B, 3, 4, and 5, the elongated antenna housing 38 is inserted into the elongated slot 36. The first end portion 50 of the conductive connection clip 48 may preferably extend through the opening 90 in the antenna housing 38 and contact against the conductive contact member 46. When the antenna member 44 is in the extended position, signals are transferred from the antenna member 44 to the circuit board 34 and vice versa. In particular, signals are transferred from the antenna collection collet 106, to the conductive contact member 46, to the conductive connection clip 48, and then the circuit board 34 housed within the PID 10. Similarly, signals may be transferred from the circuit board 34, to the conductive connection clip 48, to the conductive contact member 46, and then to the antenna collection collet 106. The advantage of this arrangement is that the antenna member 44 and antenna housing 38 conform to the existing geometry of the PID 10.

The second end portion 116 of the second conductive connection clip 112 may preferably extend through the second opening 120 and contact against the second conductive contact member 110. When the antenna member 44 is in the retracted position, signals are transferred from the antenna member 44 to the circuit board 34 and vice versa. In particular, signals are transmitted from the antenna collection collet 106, to the second conductive contact member 110, to the second conductive connection clip 112, and then the circuit board 34 housed within the PID 10. Similarly, signals may be transferred from the circuit board 34, to the second conductive connection clip 112, to the second conductive contact member 110, and then to the second antenna collection collet 106. The advantage of this arrangement is that signals will still be transferred from the antenna member 44 to the circuit board 34 and vice versa even when the antenna member 44 is in the retracted position.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A portable information device (PID) comprising:
 a housing, the housing including an elongated cylindrical groove formed therein, a circuit board disposed with the housing, a removable elongated cylindrical antenna housing slidably received in the elongated cylindrical groove, the removable elongated cylindrical antenna housing including a first end and a second end, a conductive contact member positioned within the removable elongated cylindrical antenna housing, an antenna member positioned within the removable elongated cylindrical antenna housing, the antenna member electrically connected with the conductive contact member, a conductive connection clip attached to the housing for providing an electrical connection between the conductive contact member and the circuit board, the conductive connection clip including a first end portion and a second end portion, the second end portion operatively connected to the circuit board and the first end portion contacting the conductive contact member to allow signals to be transferred from the antenna member to the circuit board and vice versa.

2. The PID of claim 1 wherein the first end portion of the conductive connection clip is positioned in the elongated cylindrical groove.

3. The PID of claim 1 wherein the housing includes a first end and a second end, the conductive connection clip positioned adjacent to the first end of the housing.

4. The PID of claim 1 wherein the conductive connection clip is comprised of a conductive alloy.

5. The PID of claim 1 wherein the elongated cylindrical groove is configured to receive a stylus.

6. The PID of claim 1 wherein the housing includes a first side and a second side, the elongated cylindrical groove positioned along the first side of the housing.

7. The PID of claim 6 further comprising a second elongated cylindrical groove positioned along the second side of the housing, the second elongated cylindrical groove positioned along the second side of the housing being identical to the elongated cylindrical groove positioned along the first side of the housing.

8. The PID of claim 7 wherein the second elongated cylindrical groove is configured to receive a stylus.

9. The PID of claim 1 wherein the conductive contact member is positioned within the removable elongated cylindrical antenna housing adjacent to the first end of the removable elongated cylindrical antenna housing.

10. The PID of claim 9 wherein the removable elongated cylindrical antenna housing includes an opening formed therein, the conductive connection clip extending through the opening to contact the conductive contact member.

11. The PID apparatus of claim 10 wherein the opening receives the first end portion of the conductive connection clip.

12. The PID of claim 1 wherein the antenna member is configured to be positioned in an extended position and a retracted position.

13. The PID of claim 1 wherein the antenna member includes a first end and a second end, the first end of the antenna member including a manually operable cap portion to allow the antenna member to be positioned between a retracted position and an extended position, the second end of the antenna member including an antenna collection collet.

14. The PID of claim 13 wherein the antenna collection collet is electrically connected with the conductive contact member and the conductive connection clip.

15. The PID of claim 1 further comprising a cover for the PID, the cover operatively connected to the removable elongated cylindrical antenna housing.

16. The PID of claim 15 further comprising a flexible hinge member, the flexible hinge member attached the cover and to the removable elongated cylindrical antenna housing.

17. The PID of claim 16 further comprising an attachment stub, the attachment stub attached to the removable elongated cylindrical antenna housing and the flexible hinge member.

18. A method of mounting an antenna in a portable information device (PID) comprising the steps of:
providing a housing for the PID, the housing including an elongated cylindrical groove formed therein, a circuit board disposed with the housing, a removable elongated cylindrical antenna housing including a first end and a second end, a conductive contact member positioned within the removable elongated cylindrical antenna housing, an antenna member positioned within the removable elongated cylindrical antenna housing, the antenna member electrically connected with the conductive contact member, a conductive connection clip attached to the housing, the conductive connection clip including a first end portion and a second end portion, the second end portion operatively connected to the circuit board;
slidably inserting the removable elongated cylindrical antenna housing into the elongated cylindrical groove;
contacting the first end portion of the conductive connection clip against the conductive contact member; and
transferring signals from the antenna member to the circuit board and vice versa.

19. The method of claim 18 wherein the removable elongated cylindrical antenna housing includes an opening formed therein and further comprising the steps of:
extending the conductive connection clip through the opening to contact the conductive contact member.

20. A portable information device (PID) comprising:
a housing, the housing including an elongated slot formed therein, a circuit board disposed with the housing, an elongated antenna housing received in the elongated slot, the elongated antenna housing including a first end and a second end, a first conductive contact member positioned within the elongated antenna housing adjacent to the first end of the elongated antenna housing, a second conductive contact member positioned within the elongated antenna housing adjacent to the second end of the elongated antenna housing, an antenna member positioned within the elongated antenna housing, the antenna member configured to be positioned in a retracted position and an extended position, the antenna member electrically connected with the first conductive contact member when the antenna member is in the extended position, the antenna member electrically connected with the second conductive contact member when the antenna member is in the retracted position, a first conductive connection clip attached to the housing for providing an electrical connection between the first conductive contact member and the circuit board, the first conductive connection clip including a first end portion and a second end portion, the second end portion of the first conductive connection clip operatively connected to the circuit board and the first end portion of the first conductive connection clip contacting the first conductive contact member to 61low signals to be transferred from the antenna member to the circuit board and vice versa when the antenna member is in the extended position, a second conductive connection clip attached to the housing for providing an electrical connection between the second conductive contact member and the circuit board, the second conductive connection clip including a first end portion and a second end portion, the first end portion of the second conductive connection clip operatively connected to the circuit board and the second end portion of the second conductive connection clip contacting the second conductive contact member to allow signals to be transmitted from the antenna member to the circuit board and vice versa when the antenna member is in the retracted position.

21. The PID of claim 20 wherein the first end portion of the first conductive connection clip is positioned in the elongated slot and the second end portion of the second conductive connection clip is positioned in the elongated slot.

22. The PID of claim 20 wherein the antenna member includes a first end and a second end, the first end of the antenna member including a manually operable cap portion to allow the antenna member to be positioned between the retracted position and the extended position, the second end of the antenna member including an antenna collection collet, the antenna collection collet electrically connected with the first conductive contact member when the antenna member is in the extended position, the antenna collection collet electrically connected with the second conductive contact member when the antenna member is in the retracted position.

23. A method of mounting an antenna in a portable information device (PID) comprising the steps of:
providing a housing for the PID, the housing including an elongated slot formed therein, a circuit board disposed with the housing, an elongated antenna housing received in the elongated slot, the elongated antenna housing including a first end and a second end, a first conductive contact member positioned within the elongated antenna housing adjacent to the first end of the elongated antenna housing, a second conductive contact member positioned within the elongated antenna housing adjacent to the second end of the elongated antenna housing, an antenna member positioned within the elongated antenna housing, the antenna member configured to be positioned in a retracted position and an extended position, the antenna member electrically connected with the first conductive contact member when the antenna member is in the extended position, the antenna member electrically connected with the second conductive contact member when the antenna member is in the retracted position, a first conductive connection clip attached to the housing, the first conductive connection clip including a first end portion and a second end portion, the second end portion of the first conductive connection clip operatively connected to the circuit board, a second conductive connection clip attached to the housing, the second conductive connection clip including a first end portion and a second end portion, the first end portion of the second conductive connection clip operatively connected to the circuit board;

inserting the elongated antenna housing into the elongated slot;

contacting the first end portion of the first conductive connection clip against the first conductive contact member;

contacting the second end portion of the second conductive connection clip against the second conductive contact member;

transferring signals from the antenna member to the circuit board and vice versa when the antenna member is in the extended position; and transferring signals from the antenna member to the circuit board and vice versa when the antenna member is in the retracted position.

24. The method of claim 23 wherein the antenna member includes a first end and a second end, the first end of the antenna member including a manually operable cap portion, the second end of the antenna member including an antenna collection collet;

positioning the antenna member in the extended position to allow the antenna collection collet to be electrically connected with the first conductive contact member; and positioning the antenna member in the retracted position to allow the antenna collection collet to be electrically connected with the second conductive contact member.

25. A portable information device (PID) comprising:
a housing, the housing including an elongated slot formed therein, a circuit board disposed with the housing, an elongated antenna housing received in the elongated slot, the elongated antenna housing including a first end and a second end, a conductive contact member positioned within the elongated antenna housing, an antenna member positioned within the elongated antenna housing, the antenna member electrically connected with the conductive contact member, a conductive connection clip attached to the housing for providing an electrical connection between the conductive contact member and the circuit board, the conductive connection clip including a first end portion and a second end portion, the second end portion operatively connected to the circuit board and the first end portion contacting the conductive contact member to allow signals to be transferred from the antenna member to the circuit board and vice versa, the housing including a first side and a second side, the elongated slot positioned along the first side of the housing, a second elongated slot positioned along the second side of the housing, the second elongated slot positioned along the second side of the housing being identical to the elongated slot positioned along the first side of the housing.

26. The PID of claim 25 wherein the second elongated slot is configured to receive a stylus.

27. A portable information device (PID) comprising:
a housing, the housing including an elongated slot formed therein, a circuit board disposed with the housing, an elongated antenna housing received in the elongated slot, the elongated antenna housing including a first end and a second end, a conductive contact member positioned within the elongated antenna housing, an antenna member positioned within the elongated antenna housing, the antenna member electrically connected with the conductive contact member, a conductive connection clip attached to the housing for providing an electrical connection between the conductive contact member and the circuit board, the conductive connection clip including a first end portion and a second end portion, the second end portion operatively connected to the circuit board and the first end portion contacting the conductive contact member to allow signals to be transferred from the antenna member to the circuit board and vice versa wherein the conductive contact member is positioned within the antenna housing adjacent to the first end of the antenna housing and wherein the elongated antenna housing includes an opening formed therein, the conductive connection clip extending through the opening to contact the conductive contact member.

28. The PID apparatus of claim 27 wherein the opening receives the first end portion of the conductive connection clip.

29. A portable information device (PID) comprising:
a housing, the housing including an elongated slot formed therein, a circuit board disposed with the housing, an elongated antenna housing received in the elongated slot, the elongated antenna housing including a first end and a second end, a conductive contact member positioned within the elongated antenna housing, an antenna member positioned within the elongated antenna housing, the antenna member electrically connected with the conductive contact member, a conductive connection clip attached to the housing for providing an electrical connection between the conductive contact member and the circuit board, the conductive connection clip including a first end portion and a second end portion, the second end portion operatively connected to the circuit board and the first end portion contacting the conductive contact member to allow signals to be transferred from the antenna member to the circuit board and vice versa wherein the antenna member includes a first end and a second end, the first end of the antenna member including a manually operable cap portion to allow the antenna member to be positioned between a retracted position and an extended position, the second end of the antenna member including an antenna collection collet.

30. The PID of claim 29 wherein the antenna collection collet is electrically connected with the conductive contact member and the conductive connection clip.

31. A portable information device (PID) comprising:

a housing, the housing including an elongated slot formed therein, a circuit board disposed with the housing, an elongated antenna housing received in the elongated slot, the elongated antenna housing including a first end and a second end, a conductive contact member positioned within the elongated antenna housing, an antenna member positioned within the elongated antenna housing, the antenna member electrically connected with the conductive contact member, a conductive connection clip attached to the housing for providing an electrical connection between the conductive contact member and the circuit board, the conductive connection clip including a first end portion and a second end portion, the second end portion operatively connected to the circuit board and the first end portion contacting the conductive contact member to allow signals to be transferred from the antenna member to the circuit board and vice versa, a cover for the PID, the cover operatively connected to the elongated antenna housing, a flexible hinge member, the flexible hinge member attached the cover and to the elongated antenna housing.

32. The PID of claim 31 further comprising an attachment stub, the attachment stub attached to the elongated antenna housing and the flexible hinge member.

33. A method of mounting an antenna in a portable information device (PID) comprising the steps of:

providing a housing for the PID, the housing including an elongated slot formed therein, a circuit board disposed with the housing, an elongated antenna housing including a first end, a second end, and an opening formed therein, a conductive contact member positioned within the elongated antenna housing, an antenna member positioned within the elongated antenna housing, the antenna member electrically connected with the conductive contact member, a conductive connection clip attached to the housing, the conductive connection clip including a first end portion and a second end portion, the second end portion operatively connected to the circuit board;

inserting the elongated antenna housing into the elongated slot;

contacting the first end portion of the conductive connection clip against the conductive contact member;

transferring signals from the antenna member to the circuit board and vice versa; and extending the conductive connection clip through the opening to contact the conductive contact member.

* * * * *

UNITED STATES PATENT AND TRADEMARK OFFICE
CERTIFICATE OF CORRECTION

PATENT NO. : 6,353,414 B1  
DATED : March 5, 2002  
INVENTOR(S) : Jeffrey L. Jones et al.

It is certified that error appears in the above-identified patent and that said Letters Patent is hereby corrected as shown below:

<u>Column 12,</u>  
Line 28, the phrase "member to 61low signals" should be changed to -- member to allow signals --.

Signed and Sealed this

Fourth Day of March, 2003

JAMES E. ROGAN  
*Director of the United States Patent and Trademark Office*